US005136517A

United States Patent [19]
Cullen et al.

[11] Patent Number: 5,136,517
[45] Date of Patent: Aug. 4, 1992

[54] METHOD AND APPARATUS FOR INFERRING BAROMETRIC PRESSURE SURROUNDING AN INTERNAL COMBUSTION ENGINE

[75] Inventors: Michael J. Cullen; John F. Armitage, both of Dearborn; Benny Vann, Detroit, all of Mich.

[73] Assignee: Ford Motor Company, Dearborn, Mich.

[21] Appl. No.: 582,704

[22] Filed: Sep. 12, 1990

[51] Int. Cl.[5] ...................... F02D 41/26; G01M 15/00

[52] U.S. Cl. ............................... 364/431.05; 364/558; 123/478; 73/118.2

[58] Field of Search ...................... 364/431.04, 431.05, 364/431.06, 558, 571.01, 571.07; 73/117.3, 116, 115, 118.2; 123/494, 478

[56] References Cited

U.S. PATENT DOCUMENTS

| | | | |
|---|---|---|---|
| 4,385,606 | 5/1983 | Hattori et al. | 123/416 |
| 4,416,239 | 11/1983 | Takase et al. | 123/478 |
| 4,582,031 | 4/1986 | Janetzke et al. | 123/478 X |
| 4,590,563 | 5/1986 | Matsumura et al. | 364/431.05 |
| 4,600,993 | 7/1986 | Pauwels et al. | 364/431.05 |
| 4,633,842 | 1/1987 | Ikeda et al. | 123/494 X |
| 4,643,152 | 2/1987 | Yamato | 364/431.05 X |
| 4,683,539 | 7/1987 | Kanno et al. | 364/431.05 |
| 4,683,858 | 8/1987 | Sato et al. | 364/431.05 X |
| 4,708,115 | 11/1987 | Yamato et al. | 123/494 |
| 4,730,255 | 3/1988 | Akiyama et al. | 364/431.05 |
| 4,787,043 | 11/1988 | Zimmerman et al. | 364/431.05 |
| 4,792,905 | 12/1988 | Sekozawa et al. | 364/431.05 |
| 4,814,997 | 3/1989 | Matsumura et al. | 364/431.05 |
| 4,825,841 | 5/1989 | Norota et al. | 364/431.06 X |
| 4,831,537 | 5/1989 | Scarnera et al. | 364/431.05 |
| 4,864,998 | 9/1989 | Onishi | 364/431.05 X |
| 4,866,620 | 9/1989 | Abe et al. | 364/431.05 |
| 4,887,216 | 12/1989 | Ohnari et al. | 364/431.06 |
| 4,897,791 | 1/1990 | Sekozawa et al. | 364/431.05 |
| 4,926,335 | 5/1990 | Flowers et al. | 364/431.05 |
| 4,938,195 | 7/1990 | Miyazaki et al. | 73/115 X |
| 5,012,422 | 4/1991 | Takahashi et al. | 364/431.05 |
| 5,029,569 | 7/1991 | Cullen et al. | 364/510 |
| 5,060,160 | 10/1991 | Binnewies | 364/431.07 |

*Primary Examiner*—Parshotam S. Lall
*Assistant Examiner*—Thomas S. Auchterlonie
*Attorney, Agent, or Firm*—Allan Lippa

[57] ABSTRACT

A mass airflow based control system for an internal combustion engine is provided which is capable of inferring barometric pressure surrounding the engine. The control system determines the air charge going into the engine from a measured value of mass airflow, and compares this value with a predicted value of air charge going into the engine, which the control system infers. Differences between the two values are first attributed to inlet air temperature, which is measured, and then to a change in barometric pressure, which is the inferred barometric pressure.

8 Claims, 6 Drawing Sheets

METHOD AND APPARATUS FOR INFERRING BAROMETRIC PRESSURE SURROUNDING AN INTERNAL COMBUSTION ENGINE

CROSS REFERENCE TO RELATED APPLICATION

Reference is hereby made to the following co-pending application, dealing with related subject matter: "Method and Apparatus for Controlling an Internal Combustion Engine," assigned U.S. Ser. No. 581,235 and filed Sep. 12, 1990, now U.S. Pat. No. 5,029,569.

BACKGROUND OF THE INVENTION

The present invention relates generally to an internal combustion engine including a mass airflow based control system and, more particularly, to an improved method and apparatus for controlling an internal combustion engine which is capable of inferring barometric pressure surrounding the engine.

In order to optimally control an internal combustion engine, it is necessary to accurately know the barometric (atmospheric) pressure surrounding the engine. Barometric pressure is used, for example, to determine the amount of fuel needed during initial cranking of the engine. Further, exhaust gas recirculation (EGR) and spark control are normally adjusted versus barometric pressure to achieve desired emissions requirements, fuel economy and drivability.

In the past, engines having mass airflow based control systems have obtained barometric pressure readings by employing barometers, which sense the barometric pressure surrounding the engine. Adding a barometer to a control system, however, is disadvantageous because of the added expense of an additional sensor. Further, it complicates the system design with additional wiring and ties up the use of an additional input channel to the engine controller.

U.S. Pat. No. 4,600,993 discloses a speed density control system which includes a manifold pressure sensor, and teaches inferring barometric pressure from manifold pressure sensor readings. However, since mass airflow based control systems do not normally employ manifold pressure sensors, such a method of inferring barometric pressure is not applicable to mass airflow based systems.

Accordingly, there is a need for an improved mass airflow based control system which is capable of determining barometric pressure surrounding an internal combustion engine without employing a barometer.

SUMMARY OF THE INVENTION

This need is met by the mass airflow based control system of the present invention wherein barometric pressure is inferred from an actual, measured value of air charge going into an internal combustion engine and an inferred, predicted value of air charge going into the engine. The two values are compared and differences between the two values are first attributed to inlet air temperature, which is measured, and then to a change in barometric pressure, which is the inferred barometric pressure.

In accordance with a first aspect of the present invention, a method for inferring barometric pressure surrounding an internal combustion engine is included and comprises the steps of: measuring air mass flow entering the engine; measuring the temperature of air entering the engine; storing predetermined data which is representative of predicted air mass flow inducted into the engine at a standard pressure and temperature; deriving from the predetermined data a first value which is representative of predicted air mass flow inducted into the engine at the standard pressure and temperature; and inferring the barometric pressure surrounding the engine in response to the measured air mass flow, the first value and the measured air temperature.

In a first embodiment, the first value comprises predicted air mass flow inducted into the engine, and the step of inferring the barometric pressure comprises the step of solving the following equation:

$$BP = \frac{Ca * Sp}{Ci * SQRT\,[St/T]}$$

wherein BP is the inferred barometric pressure, Ca comprises the measured air mass flow inducted into the engine; Ci is the first value comprising predicted air mass flow inducted into the engine; T is the measured air temperature; Sp is equal to the standard pressure; and St is equal to the standard pressure.

In a second embodiment, the first value comprises predicted air charge inducted into the engine, and the method further comprises the step of deriving a second value which comprises the actual air charge entering the engine from the measured air mass flow. The step of inferring the barometric pressure surrounding the engine is performed in response to the first value, the second value, and the measured air temperature, and comprises the step of solving the following equation:

$$BP = \frac{Ca * Sp}{Ci * SQRT\,[St/T]}$$

wherein Bp is the inferred barometric pressure; Ca comprises the second value; Ci is the first value comprising predicted air charge inducted into the engine; T is the measured air temperature; Sp is equal to the standard pressure; and St is equal to the standard pressure.

In accordance with a second aspect of the present invention a method is provided for inferring barometric pressure surrounding an internal combustion engine having an intake manifold, a throttle valve positionable over a given angular range, an EGR valve capable of allowing a variable amount of exhaust gases to recirculate into the intake manifold, and an air bypass valve operable over a given air bypass valve duty cycle range. The method comprises the steps of: measuring air mass flow entering the intake manifold; measuring the temperature of air entering the intake manifold; storing first predetermined data which is representative of predicted air mass flow inducted into the intake manifold via the throttle valve with 0 exhaust gases flowing into the intake manifold through the EGR valve; storing second predetermined data which is indicative of predicted air mass flow which is prevented from passing into the intake manifold due to exhaust gases flowing into the intake manifold through the EGR valve; and storing third predetermined data which is representative of predicted air mass flow inducted into the intake manifold via the air bypass valve. The method further comprises the steps of: deriving from the first predetermined data a first value representative of predicted air mass flow inducted into the intake manifold via the throttle valve with 0 exhaust gases flowing into the intake manifold; deriving from the second predetermined data a second value indicative of predicted air mass flow which is prevented from passing into the intake manifold due to exhaust gases flowing into the manifold via the EGR valve; deriving from the third predetermined data a third value which is representative of predicted air mass flow inducted into the intake manifold via the air bypass valve; deriving a fourth value from the first, second and third values which is representative of predicted air mass flow inducted into the intake manifold via the throttle valve and the air bypass valve; and inferring the barometric pressure surrounding the engine in response to the measured air mass flow, the fourth value and the measured air temperature.

In a first embodiment of the present invention, the first predetermined data comprises predicted air mass flow inducted into the intake manifold via the throttle valve with 0 exhaust gases flowing into the intake manifold through the EGR valve, the first value comprises predicted air mass flow inducted into the intake manifold via the throttle valve with 0 exhaust gases flowing into the intake manifold, the third value comprises predicted air mass flow inducted into said intake manifold via said air bypass valve, and the fourth value comprises predicted air mass flow inducted into the intake manifold via the throttle valve and the air bypass valve.

The step of inferring the barometric pressure comprises the step of solving the following equation:

$$BP = \frac{Ca * Sp}{Ci * SQRT\,[St/T]}$$

wherein:

BP is the inferred barometric pressure; Ca is the measured air mass flow; Ci is the fourth value comprising predicted air mass flow inducted into the intake manifold; T is the measured air temperature; Sp is equal to the standard pressure; and St is equal to the standard temperature.

In a second embodiment of the present invention, the first predetermined data comprises predicted air charge inducted into the intake manifold via the throttle valve with 0 exhaust gases flowing into the intake manifold through the EGR valve; the second predetermined data is indicative of predicted air charge which is prevented from passing into the intake manifold due to exhaust gases flowing into the intake manifold through the EGR valve; the first value comprises predicted air charge inducted into the intake manifold via the throttle valve with 0 exhaust gases flowing into the intake manifold; the second value is indicative of predicted air charge which is prevented from passing into the intake manifold due to exhaust gases flowing into the manifold via the EGR valve; the third value comprises predicted air mass flow inducted into the intake manifold via the air bypass valve; and the fourth value comprises predicted air charge inducted into the intake manifold via the throttle valve and the air bypass valve. The method further comprises the step of deriving a fifth value which comprises the actual air charge entering the intake manifold from the measured air mass flow, and the step of inferring the barometric pressure surrounding the engine is performed in response to the fourth value, the fifth value and the measured air temperature.

The step of inferring the barometric pressure comprises the step of solving the following equation:

$$BP = \frac{Ca * Sp}{Ci * SQRT\,[St/T]}$$

wherein:

BP is the inferred barometric pressure; Ca comprises the fifth value; Ci is the fourth value representative of predicted air charge inducted into the intake manifold; T is the measured air temperature; Sp is equal to the standard pressure; and St is equal to the standard temperature.

In accordance with a third aspect of the present invention, a method is provided for inferring barometric pressure surrounding a motor vehicle internal combustion engine having an intake manifold, a throttle valve positionable over a given angular range, an EGR valve capable of allowing a variable amount of exhaust gases to recirculate into the intake manifold, and an air bypass valve operable over a given air bypass valve duty cycle range. The method comprises the steps of: measuring the rotational speed of the internal combustion engine; measuring the angular position of the throttle valve; measuring air mass flow entering the intake manifold; measuring the temperature of air entering the intake manifold; storing predetermined data in a first look-up table which is representative of predicted air mass flow inducted into the intake manifold via the throttle valve with 0 exhaust gases flowing into the intake manifold as a function of the rotational speed of the engine and the angular position of the throttle valve; storing predetermined data in a second look-up table which is indicative of predicted air mass flow which is prevented from passing into the intake manifold due to exhaust gases flowing into the manifold through the EGR valve as a function of the rotational speed of the engine and the angular position of the throttle valve; and storing predetermined data in a third look-up table which is representative of predicted air mass flow inducted into the intake manifold via the air bypass valve as a function of the air bypass valve duty cycle and a ratio of predicted current air charge going into the engine to predicted peak air charge capable of going into the engine. The method further comprises the steps of; deriving a first value representative of predicted air mass inducted into the intake manifold via the throttle valve with 0 exhaust gases flowing into the intake manifold by comparing the rotational speed of the engine and the angular position of the throttle valve with the predetermined data stored in the first look-up table; deriving a second value indicative of predicted air mass flow which is prevented from passing into the intake manifold due to exhaust gases flowing into the manifold through the EGR valve by comparing the rotational speed of the engine and the angular position of the throttle valve with the predetermined data stored in the second look-up table; deriving a third value representative of predicted air mass inducted into the intake manifold via the air bypass valve by comparing the air bypass valve duty cycle and the ratio of predicted current air charge going into the engine to predicted peak air charge with the third look-up table; deriving a fourth value from the first, second and third values which is representative of predicted air mass flow inducted into the intake manifold via the throttle valve and the air bypass valve; and inferring the barometric pressure surrounding the engine in response to the fourth value, the measured air mass flow and the measured air temperature.

In accordance with a fourth aspect of the present invention, a method is provided for inferring barometric pressure surrounding an internal combustion engine having an intake manifold, a throttle valve positionable over a given angular range, an EGR valve capable of allowing a variable amount of exhaust gases to recirculate into the intake manifold, and an air bypass valve operable over a given air bypass valve duty cycle range. The method comprises the steps of: measuring air mass flow entering the intake manifold; measuring the temperature of air entering the intake manifold; storing first predetermined data comprising predicted air mass flow inducted into the intake manifold via the throttle valve with 0 exhaust gases flowing into the intake manifold through the EGR valve; storing second predetermined data which is indicative of predicted air mass flow which is prevented from passing into the intake manifold due to exhaust gases flowing into the intake manifold through the EGR valve; and storing third predetermined data comprising predicted air mass flow inducted into the intake manifold via the air bypass valve. The method further comprises deriving from the first predetermined data a first value comprising predicted air mass flow inducted into the intake manifold via the throttle valve with 0 exhaust gases flowing into the intake manifold; deriving from the second predetermined data a second value indicative of predicted air mass flow which is prevented from passing into the intake manifold due to exhaust gases flowing into the manifold via the EGR valve; deriving from the third predetermined data a third value comprising predicted air mass flow inducted into the intake manifold via the air bypass valve; deriving a fourth value from the first, second and third values comprising predicted air mass flow inducted into the intake manifold via the throttle valve and the air bypass valve; and inferring the barometric pressure surrounding the engine in response to the measured air mass flow, the fourth value and the measured air temperature.

The step of inferring the barometric pressure preferably comprises the step of solving the following equation:

$$BP = \frac{Ca * Sp}{Ci * SQRT[St/T]}$$

wherein:

BP is the inferred barometric pressure; Ca is equal to the measured air mass flow inducted into the intake manifold; Ci is the fourth value comprising predicted air mass flow inducted into the intake manifold; T is the measured air temperature; Sp is equal to the standard pressure; and St is equal to the standard temperature.

In accordance with a fifth aspect of the present invention, a method is provided for inferring barometric pressure surrounding an internal combustion engine having an intake manifold, a throttle valve positionable over a given angular range, an EGR valve capable of allowing a variable amount of exhaust gases to recirculate into the intake manifold, and an air bypass valve operable over a given air bypass valve duty cycle range. The method comprises the steps of: measuring air mass flow entering the intake manifold; measuring the temperature of air entering the intake manifold; storing first predetermined data comprising predicted air charge inducted into the intake manifold via the throttle valve with 0 exhaust gases flowing into the intake manifold through the EGR valve; storing second predetermined data which is indicative of predicted air charge which is prevented from passing into the intake manifold due to exhaust gases flowing into the intake manifold through the EGR valve; and storing third predetermined data comprising predicted air mass flow inducted into the intake manifold via the air bypass valve. The method further includes deriving from the first predetermined data a first value comprising predicted air charge inducted into the intake manifold via the throttle valve with 0 exhaust gases flowing into the intake manifold; deriving from the second predetermined data a second value indicative of predicted air charge which is prevented from passing into the intake manifold due to exhaust gases flowing into the manifold via the EGR valve; deriving from the third predetermined data a third value comprising predicted air mass flow inducted into the intake manifold via the air bypass valve; deriving a fourth value from the first, second and third values comprising predicted air charge inducted into the intake manifold via the throttle valve and the air bypass valve; deriving a fifth value equal to the actual air charge entering the manifold from the measured air mass flow; and inferring the barometric pressure surrounding the engine in response to the fourth value, the fifth value, and the measured air temperature.

The step of inferring the barometric pressure comprises the step of solving the following equation:

$$BP = \frac{Ca * Sp}{Ci * SQRT[St/T]}$$

wherein

BP is the inferred barometric pressure; Ca comprises the fifth value; Ci is the fourth value comprising predicted air charge inducted into the intake manifold; T is the measured air temperature; Sp is equal to the standard pressure; and St is equal to the standard temperature.

In accordance with a sixth aspect of the present invention, a system for inferring barometric pressure surrounding an internal combustion engine is provided and comprises: means for measuring air mass flow entering the engine; means for measuring the temperature of air entering the engine; and processor means connected to the air mass flow measuring means and the air temperature measuring means for receiving inputs of the air mass flow and the air temperature, for storing predetermined data which is representative of predicted air mass flow inducted into the engine at a standard pressure and temperature, for deriving from the predetermined data a first value which is representative of predicted air mass flow inducted into the engine at the standard temperature and pressure, and for inferring the barometric pressure surrounding the engine in response to the measured air mass flow input, the first value and the measured temperature input.

In a first embodiment, the first value comprises predicted air mass flow inducted into the engine, and the processor means infers the barometric pressure by solving the equation set forth above with respect to the first embodiment of the first aspect of the present invention.

In a second embodiment, the first value comprises predicted air charge inducted into the engine, and the processor means derives a second value which comprises the actual air charge entering the engine from the measured air mass flow. The processor means infers the barometric pressure surrounding the engine by solving the equation set forth above with respect to the second embodiment of the first aspect of the present invention.

In accordance with a seventh aspect of the present invention, a system is provided for inferring barometric pressure surrounding an internal combustion engine including an intake manifold, a throttle valve positionable over a given angular range, an EGR valve capable of allowing a variable amount of exhaust gases to recirculate into the intake manifold, and an air bypass valve operable over a given air bypass valve duty cycle range. The system comprises: means for measuring air mass flow entering the intake manifold; means for measuring the temperature of air entering the intake manifold; and processor means connected to the air mass flow measuring means and the air temperature measuring means for receiving inputs of the air mass flow and the air temperature. The processor means includes memory means for storing first predetermined data which is representative of predicted air mass flow inducted into the intake manifold via the throttle valve with 0 exhaust gases flowing into the intake manifold through the EGR valve, for storing second predetermined data which is indicative of predicted air mass flow which is prevented from passing into the intake manifold due to exhaust gases flowing into the intake manifold through the EGR valve, and for storing third predetermined data which is representative of predicted air mass flow inducted into the intake manifold via the air bypass valve. The processor means derives from the first predetermined data a first value representative of predicted air mass flow inducted into the intake manifold via the throttle valve with 0 exhaust gases flowing into the intake manifold through the EGR valve, derives from the second predetermined data a second value indicative of predicted air mass flow which is prevented from passing into the intake manifold due to exhaust gases flowing into the manifold through the EGR valve, derives from the third predetermined data a third value representative of predicted air mass flow inducted into the intake manifold via the air bypass valve, and derives a fourth value from the first, second and third values which is representative of predicted air mass flow inducted into the intake manifold via the throttle valve and the air bypass valve. The processor means further infers the barometric pressure surrounding the engine in response to the measured air mass flow input, the fourth value and the measured air temperature input.

In a first embodiment of the present invention, the first predetermined data comprises predicted air mass flow inducted into the intake manifold via the throttle valve with 0 exhaust gases flowing into the intake manifold through the EGR valve, the first value comprises predicted air mass flow inducted into the intake manifold via the throttle valve with 0 exhaust gases flowing into the intake manifold, the third value comprises predicted air mass flow inducted into said intake manifold via said air bypass valve, and the fourth value comprises predicted air mass flow inducted into the intake manifold via the throttle valve and the air bypass valve.

The processor means preferably infers the barometric pressure by solving the equation discussed above with respect to the first embodiment of the second aspect of the present invention.

In a second embodiment of the present invention, the first predetermined data comprises predicted air charge inducted into the intake manifold via the throttle valve with 0 exhaust gases flowing into the intake manifold through the EGR valve;.the second predetermined data is indicative of predicted air charge which is prevented from passing into the intake manifold due to exhaust gases flowing into the intake manifold through the EGR valve; the first value comprises predicted air charge inducted into the intake manifold via the throttle valve with 0 exhaust gases flowing into the intake manifold; the second value is indicative of predicted air charge which is prevented from passing into the intake manifold due to exhaust gases flowing into the manifold via the EGR valve; the third value comprises predicted air mass flow inducted into the intake manifold via the air bypass valve; and the fourth value comprises predicted air charge inducted into the intake manifold via the throttle valve and the air bypass valve. The processor means further derives a fifth value which comprises the actual air charge entering the intake manifold from the measured air mass flow, and infers the barometric pressure surrounding the engine in response to the fourth value, the fifth value and the measured air temperature.

The processor infers the barometric pressure by solving the equation set forth above with respect to the second embodiment of the second aspect of the present invention.

In accordance with a eighth aspect of the present invention a control system is provided for inferring barometric pressure surrounding a motor vehicle internal combustion engine including an intake manifold, a throttle valve positionable over a given angular range, an EGR valve capable of allowing a variable amount of exhaust gases to recirculate into the intake manifold, and an air bypass valve operable over a given air bypass valve duty cycle range. The system comprises: means for measuring the rotational speed of the internal combustion engine; means for measuring the angular position of the throttle valve; means for measuring air mass flow entering the intake manifold; means for measuring the temperature of air entering the intake manifold; and derivation means connected to the engine speed measuring means, the throttle valve position measuring means, the air mass flow measuring means and the air temperature measuring means for receiving inputs of the engine speed, the throttle valve angular position, the air mass flow and the air temperature. The derivation means includes memory means for storing predetermined data in a first look-up table which is representative of predicted air mass flow inducted into the intake manifold via the throttle valve with 0 exhaust gases flowing into the intake manifold through the EGR valve as a function of a first portion of the inputs, storing predetermined data in a second look-up table which is indicative of predicted air mass flow which is prevented from passing into the intake manifold due to exhaust gases flowing into the manifold through the EGR valve as a function of the first portion of the inputs, and storing predetermined data in a third look-up table which is representative of predicted air mass flow inducted into the intake manifold via the air bypass valve as a function of the air bypass valve duty cycle and a ratio of predicted current air charge going into the engine to predicted peak air charge capable of going into the engine. The derivation means derives a first value representative of predicted air mass flow inducted into the intake manifold via the throttle valve with 0 exhaust gases flowing into the intake manifold by comparing the first portion of the inputs with the predetermined data stored in the first look-up table, derives a second value indicative of predicted air mass flow which is prevented from passing into the intake manifold due to exhaust gases flowing into the manifold through the EGR valve by comparing the first portion of the inputs with the predetermined data stored in the second look-up table, derives a third value representative of predicted air mass flow inducted into the intake manifold via the air bypass valve by comparing the air bypass valve duty cycle and the ratio of predicted current air charge going into the engine to predicted peak air charge with the third look-up table, and derives a fourth value from the first, second and third values which is representative of predicted air mass flow inducted into the intake manifold via the throttle valve and the air bypass valve. The derivation means infers the barometric pressure surrounding the engine in response to the fourth value and a second portion of the inputs.

The first portion of the inputs comprises the engine speed input and the throttle valve angular position input, and the second portion of the inputs comprises the air mass flow input and the air temperature input.

In accordance with an ninth aspect of the present invention, a system is provided for inferring barometric pressure surrounding an internal combustion engine including an intake manifold, a throttle valve positionable over a given angular range, an EGR valve capable of allowing a variable amount of exhaust gases to recirculate into the intake manifold, and an air bypass valve operable over a given air bypass valve duty cycle range. The system comprises: means for measuring air mass flow entering the intake manifold; means for measuring the temperature of air entering the intake manifold; and processor means connected to the air mass flow measuring means and the air temperature measuring means for receiving inputs of the air mass flow and the air temperature. The processor means includes memory means for storing first predetermined data comprising predicted air mass flow inducted into the intake manifold via the throttle valve with 0 exhaust gases flowing into the intake manifold through the EGR valve, storing second predetermined data which is indicative of predicted air mass flow which is prevented from passing into the intake manifold due to exhaust gases flowing into the intake manifold through the EGR valve, and storing third predetermined data comprising predicted air mass flow inducted into the intake manifold via the air bypass valve. The processor means derives from the first predetermined data a first value comprising predicted air mass flow inducted into the intake manifold via the throttle valve with 0 exhaust gases flowing into the intake manifold through the EGR valve, derives from the second predetermined data a second value indicative of predicted air mass flow which is prevented from passing into the intake manifold due to exhaust gases flowing into the manifold through the EGR valve, derives from the third predetermined data a third value comprising predicted air mass flow inducted into the intake manifold via the air bypass valve, and derives a fourth value from the first, second and third values comprising predicted air mass flow inducted into the intake manifold via the throttle valve and the air bypass valve, and infers the barometric pressure surrounding the engine in response to the measured air mass flow input, the fourth value and the measured air temperature input.

The processor means infers the barometric pressure by solving the equation for finding inferred barometric pressure discussed above with respect to the fourth aspect of the present invention.

In accordance with another aspect of the present invention, a system is provided for inferring barometric pressure surrounding an internal combustion engine including an intake manifold, a throttle valve positionable over a given angular range, an EGR valve capable of allowing a variable amount of exhaust gases to recirculate into the intake manifold, and an air bypass valve operable over a given air bypass valve duty cycle range. The system comprises: means for measuring air mass flow entering the intake manifold; means for measuring the temperature of air entering the intake manifold; and processor means connected to the air mass flow measuring means and the air temperature measuring means for receiving inputs of the air mass flow and the air temperature. The processor means includes memory means for storing first predetermined data comprising predicted air charge flow inducted into the intake manifold via the throttle valve with 0 exhaust gases flowing into the intake manifold through the EGR valve, storing second predetermined data which is indicative of predicted air charge which is prevented from passing into the intake manifold due to exhaust gases flowing into the intake manifold through the EGR valve, and storing third predetermined data comprising predicted air mass flow inducted into the intake manifold via the air bypass valve. The processor means derives from the first predetermined data a first value comprising predicted air charge inducted into the intake manifold via the throttle valve with 0 exhaust gases flowing into the intake manifold through the EGR valve, derives from the second predetermined data a second value indicative of predicted air charge which is prevented from passing into the intake manifold due to exhaust gases flowing into the manifold through the EGR valve, derives from the third predetermined data a third value comprising predicted air mass flow inducted into the intake manifold via the air bypass valve, derives a fourth value from the first, second and third values comprising predicted air charge inducted into the intake manifold via the throttle valve and the air bypass valve, and derives a fifth value equal to the actual air charge entering the intake manifold from the measured air mass flow. The processor means infers the barometric pressure surrounding the engine in response to the fourth value, the fifth value and the measured air temperature input.

The processor means infers the barometric pressure by solving the equation for finding inferred barometric pressure discussed above with respect to the fifth aspect of the present invention.

In accordance with the above aspects of the present invention, the mass airflow based control system is capable of determining an inferred value of barometric pressure surrounding an internal combustion without having to employ pressure readings from a barometric pressure sensor. As a result, the need for a barometric pressure sensor in a mass airflow based control system is eliminated. A cost reduction advantage is thereby obtained from the elimination of a previously needed sensor. This and other advantages of the invention will be apparent from the following description, the accompanying drawings and the appended claims.

DETAILED DESCRIPTION OF THE INVENTION

Figure 1:
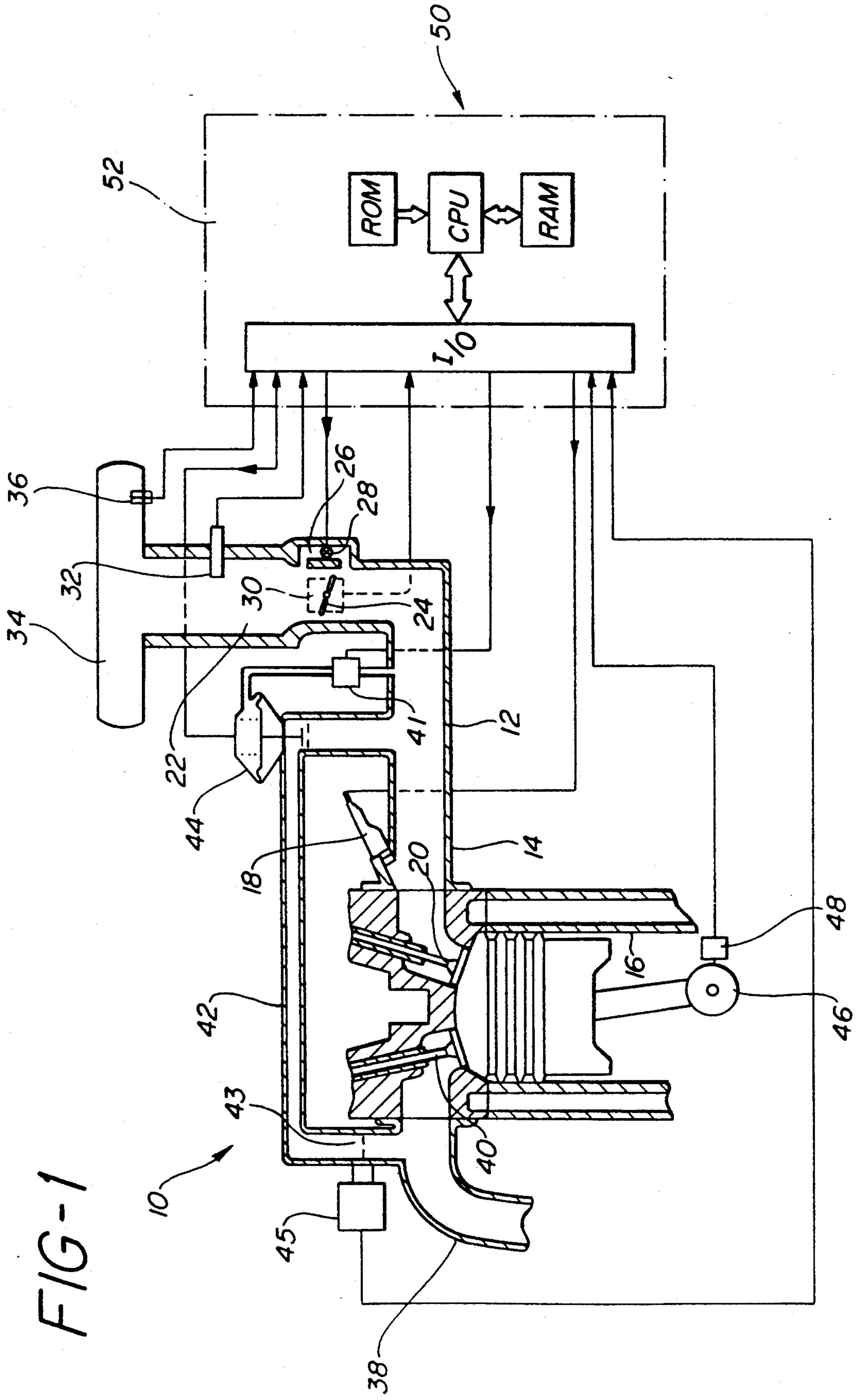
FIG. 1 shows an engine system to which the embodiments of the present invention are applied.

FIG. 1 shows schematically in cross-section an internal combustion engine 10 to which an embodiment of the present invention is applied. The engine 10 includes an intake manifold 12 having a plurality of ports or runners 14 (only one of which is shown) which are individually connected to a respective one of a plurality of cylinders or combustion chambers 16 (only one of which is shown) of the engine 10. A fuel injector 18 is coupled to each runner 14 near an intake valve 20 of each respective chamber 16. The intake manifold 12 is also connected to an induction passage 22 which includes a throttle valve 24, a bypass passage 26 which leads around the throttle valve 24 for, inter alia, idle control, and an air bypass valve 28. A position sensor 30 is operatively connected with the throttle valve 24 for sensing the angular position of the throttle valve 24. The induction passage 22 further includes a mass airflow sensor 32, such as a hot-wire air meter. The induction passage 22 also has mounted at its upper end an air cleaner system 34 which includes an inlet air temperature sensor 36. Alternatively, the sensor 36 could be mounted within the intake manifold 12.

The engine 10 further includes an exhaust manifold 38 connected to each combustion chamber 16. Exhaust gas generated during combustion in each combustion chamber 16 is released into the atmosphere through an exhaust valve 40 and the exhaust manifold 38. In communication with both the exhaust manifold 38 and the intake manifold 12 is a return passageway 42. Associated with the passageway 42 is a pneumatically actuated exhaust gas recirculation (EGR) valve 44 which serves to allow a small portion of the exhaust gases to flow from the exhaust manifold 38 into the intake manifold 12 in order to reduce NOx emissions and improve fuel economy. The EGR valve 44 is connected to a vacuum modulating solenoid 41 which controls the operation of the EGR valve 44.

The passageway 42 includes a metering orifice 43 and an differential pressure transducer 45, which is connected to pressure taps up and downstream of the orifice 43. The transducer 45, which is commercially available from Kavlico, Corporation, serves to output a signal P which is representative of the pressure drop across the orifice 43.

Operatively connected with the crankshaft 46 of the engine 10 is a crank angle detector 48 which detects the rotational speed (N) of the engine 10.

In accordance with the present invention, a mass airflow based control system 50 is provided which, inter alia, is capable of inferring barometric pressure surrounding the engine 10. The system includes a control unit 52, which preferably comprises a microprocessor. The control unit 52 is arranged to receive inputs from the throttle valve position sensor 30, the mass airflow sensor 32, the inlet air temperature sensor 36, the transducer 45, and the crank angle detector 48 via an I/O interface. The read only memory (ROM) of the microprocessor stores various operating steps, predetermined data and initial values of a ratio R and barometric pressure BP. As will be discussed in further detail below, by employing the stored steps, the predetermined data, the initial values of R and BP, and the inputs described above, the control unit 52 is capable of inferring barometric pressure surrounding the engine 10.

It is noted that the control system 50 additionally functions to control, for example, the ignition control system (not shown), the fuel injection system including injectors 18, the duty cycle of the air bypass valve 28, and the duty cycle of the solenoid 41, which serves to control the operation of the EGR valve 44. It is also noted that the present invention may be employed with any mass airflow equipped fuel injection system, such as a multiport system or a central fuel injection system. Additionally, the present invention may be employed with any control system which employs an EGR valve and is capable of determining or inferring the mass flow rate of exhaust gases traveling from the exhaust manifold into the intake manifold via the EGR valve.

A brief explanation now follows describing the manner in which the control unit 52 infers barometric pressure surrounding the engine 10. The control unit 52 first receives a value F inputted from the mass airflow sensor 32 which equals the mass of airflow going into the engine 10. This value F is used by the control unit 52 to derive a value Ca equal to the actual air charge going into the engine 10. The value Ca is also considered to be representative of the mass of airflow inducted into the engine 10. An inferred value of air charge Ci going into the engine via the throttle valve 24 and the air bypass valve 28 is then determined by the control unit 52 by employing pre-determined data contained in look-up tables, the current duty cycle of the air bypass valve 28, which is always known to the control unit 52, the ratio R, which is equal to predicted current air charge going into the engine 10 to predicted peak air charge capable of going into the engine 10, and inputs of throttle position, EGR exhaust mass flow rate, and engine speed N. The inferred value Ci of air charge is also considered to be representative of the predicted mass of airflow inducted into the engine 10. Thereafter, the inferred barometric pressure is determined by comparing the actual air charge Ca going into the engine 10 to the inferred air charge Ci. Differences between the two calculations are first attributed to inlet air temperature, which is measured by the sensor 36, and then to a change in barometric pressure, which is the inferred barometric pressure.

Figure 2:
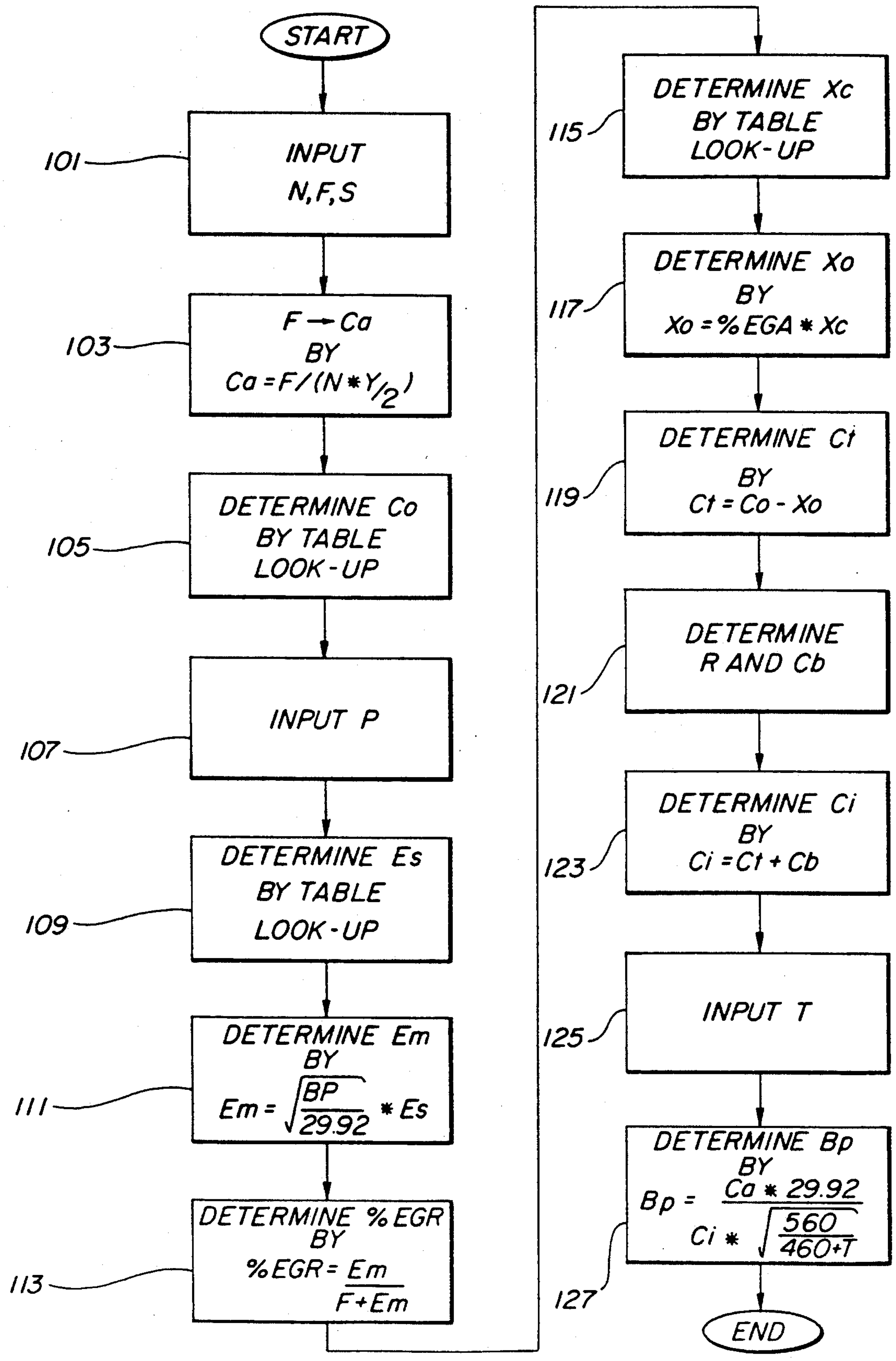
FIG. 2 is a flow chart depicting steps which are employed to infer barometric pressure surrounding an internal combustion engine.

FIG. 2 shows in flow chart form the steps which used by the control system 50 of the present invention to infer barometric pressure.

As shown, the first step 101 is to sample input signals from each of the following sensors: the crank angle detector 48 to determine the engine speed N (RPM); the mass airflow sensor 32 to obtain the value F (pounds/minute), which is equal to the mass of airflow going into the engine 10; and the throttle valve position sensor 30 to obtain a value S (degrees), which is indicative of the angular position of the throttle valve 24.

In step 103, the value F is used to obtain the value Ca, which is equal to the actual air charge (pounds/cylinder-fill) going into the engine 10, using the following equation:

$$Ca=F/(N*Y/2)$$

wherein:

F is the value inputted from the mass airflow sensor 32;

N is the engine speed in RPM; and

Y is the number of cylinders in the engine 10.

In step 105, an inferred air charge value Co, equal to the predicted air charge going into the throttle valve 24 at 0% EGR (i.e., no exhaust gases recirculated into the intake manifold 12 via the EGR valve 44) and at a standard pressure and temperature, such as 29.92 inHg and 100 degrees F., respectively, is derived using a table look-up technique. The control unit 52 contains a look-up table recorded in terms of the parameters N, S, and Co (as shown by the graphical representation for four values of N in FIG. 3) for this purposed.

In step 107, the input signal from the transducer 45 is sampled to determine a value P, which is representative of the pressure drop across the orifice 43.

Figure 4:
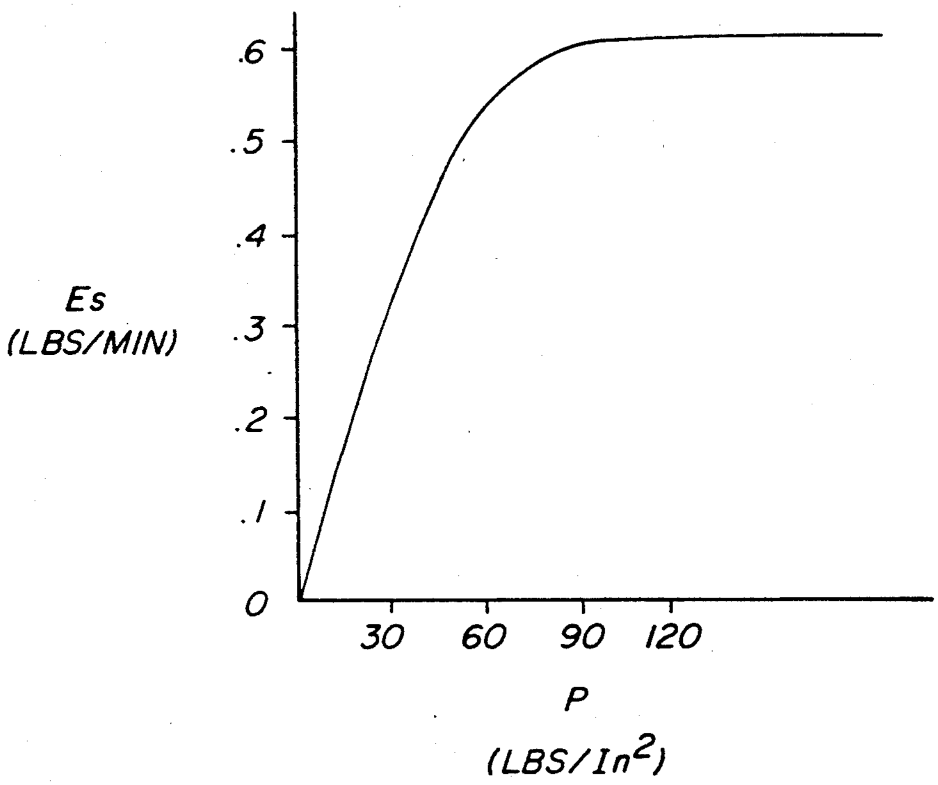
FIG. 4 is a graphical representation of a second table which is recorded in memory in terms of pressure drop P across the orifice and a value Es which is equal to the predicted amount of exhaust gases flowing from the exhaust manifold 38 into the intake manifold 12 via the EGR valve 44 at sea level.

In step 109, a value Es, which is a predicted value of the amount of exhaust gases flowing from the exhaust manifold 38 into the intake manifold 12 via the EGR valve 44 at sea level, is derived using a table look-up technique. The control unit 52 contains a look-up table recorded in terms of two variables, namely, Es and P (as shown by the graphical representation in FIG. 4) for this purpose.

In step 111, a value Em, which is equal to the predicted amount of exhaust gases flowing from the exhaust manifold 38 into the intake manifold 12 via the EGR valve 44 at current barometric pressure is determined by using the following equation:

$$Em=SQRT[BP/29.92]*Es$$

wherein:

BP is equal to barometric pressure; and

Es is equal the amount of exhaust gases flowing from the exhaust manifold 38 into the intake manifold 12 via the EGR valve 44 at sea level.

It is noted, that when the engine 10 is started for the first time, an initial, stored value of BP is retrieved from ROM and employed by the control unit 52 when solving for Em. This initial value of BP is arbitrarily selected, and preferably is equal to a middle, common value of barometric pressure. Thereafter, the last value of inferred barometric pressure BP is used in the above equation for BP. Further, when the engine 10 is turned off, the last value of barometric pressure inferred by the control unit 52 is stored in the control unit 52 in keep alive memory to be used in the initial calculation of Em when the engine is re-started.

In step 113, % EGR is determined by using the $$\% \, EGR = \frac{Em}{F + Em}$$

wherein:

Em is the EGR mass flow rate; and

F is the value inputted from the mass airflow sensor 32.

Figure 5:
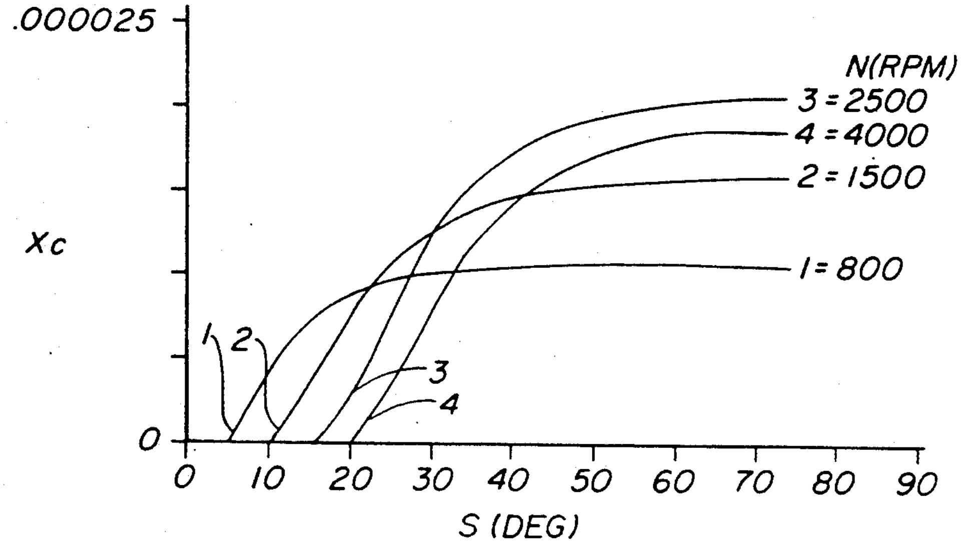
FIG. 5 is a graphical representation of a third table which is recorded in memory in terms of engine speed N, throttle valve angular position S and the value Xc which is equal to (air charge reduction/% EGR)

In step 115, a value Xc, which is indicative of the amount of air charge which is prevented from passing into the intake manifold 12 due to exhaust gases flowing through the EGR valve 44 into the manifold 12, is derived using a table look-up technique. The value Xc is equal to (air charge reduction/% EGR), at standard pressure and temperature. The control unit 52 contains a look-up table recorded in terms of three parameters, namely, N, S and Xc (as shown by the graphical representation for four values of N in FIG. 5) for this purpose.

In step 117, an inferred value Xo, which is equal to the amount of air charge prevented from passing through the throttle valve 24 at standard pressure and temperature due to exhaust gases flowing through the EGR valve 44, is determined by using the following equation:

$$Xo=\% \, EGR*Xc$$

wherein:

% EGR is determine as set forth in step 109, supra; and

Xc=(air charge reduction/% EGR).

In step 119, an inferred air charge value Ct equal to the predicted air charge going into the throttle valve 24 at standard pressure and temperature is determined by using the following equation:

$$Ct=Co-Xo$$

wherein:

Co is equal to the predicted air charge going into the throttle valve 24 at 0% EGR; and Xo is equal to the predicted amount of air charge prevented from passing through the throttle valve 24 due to exhaust gases flowing into the intake manifold 12 via the EGR valve 44.

In step 121, an inferred air charge value Cb, equal to the predicted air charge going into the engine 10 via the air bypass valve 28 and the ratio R of inferred current air charge going into the engine 10 to predicted peak air charge capable of going into the engine 10, both at standard pressure and temperature, are derived. The steps which are used to determine the value Cb and the ratio R are shown in flow chart form in FIG. 6, and will be discussed in detail below.

In step 123, the inferred value Ci equal to predicted air charge Ci going into the engine via the throttle valve 24 and the air bypass valve 28 is determined by summing Ct and Cb.

In step 125, the input from the inlet air temperature sensor 36 is sampled to obtain the value T, which is representative of the temperature of the air entering the induction passage 22 of the engine 10.

In step 127, barometric pressure BP is inferred by employing the following equation:

$$BP = \frac{Ca * 29.92}{Ci * SQRT[560/(460 + T)]}$$

wherein:

Ca is equal to the actual air charge value;

Ci is equal to the inferred air charge value;

29.92 is standard pressure (inHg);

560 is standard temperature (deg. R); and 460 is a constant which is added to the value T to convert the same from degrees Fahrenheit to degrees Rankine.

It is noted that the control unit 52 continuously updates its value of inferred barometric pressure BP by continuously running the steps illustrated in FIG. 2 when the engine 10 is operating.

Figure 6:
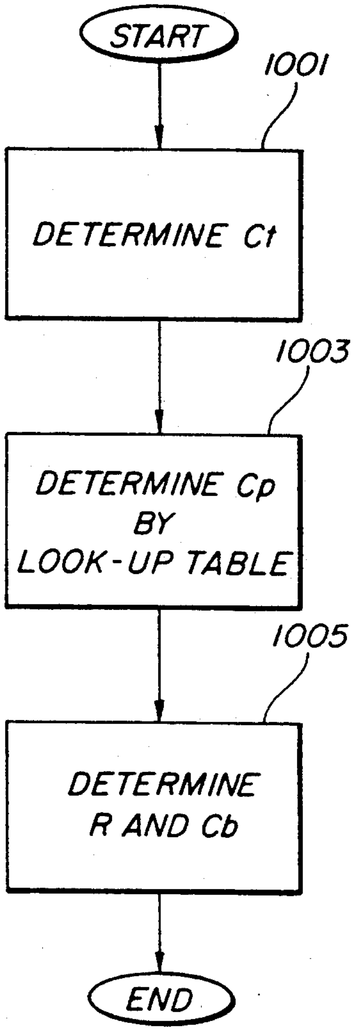
FIG. 6 is a flow chart depicting steps which are used to determine the inferred air charge value Cb, equal to the predicted air charge going into the engine via the air bypass valve, and the ratio R, equal to predicted current air charge going into the engine to predicted peak air charge.

Referring now to FIG. 6, the steps which are used to determine the inferred air charge value Cb, equal to the predicted air charge going into the engine 10 via the air bypass valve 28, and the ratio R, equal to predicted current air charge going into the engine to predicted peak air charge capable of going into the engine, both at standard pressure and temperature, will now be described in detail.

In step 1001, the inferred value Ct of air charge going into the throttle valve 24 is determined as set forth in steps 105–119, supra.

Figure 7:
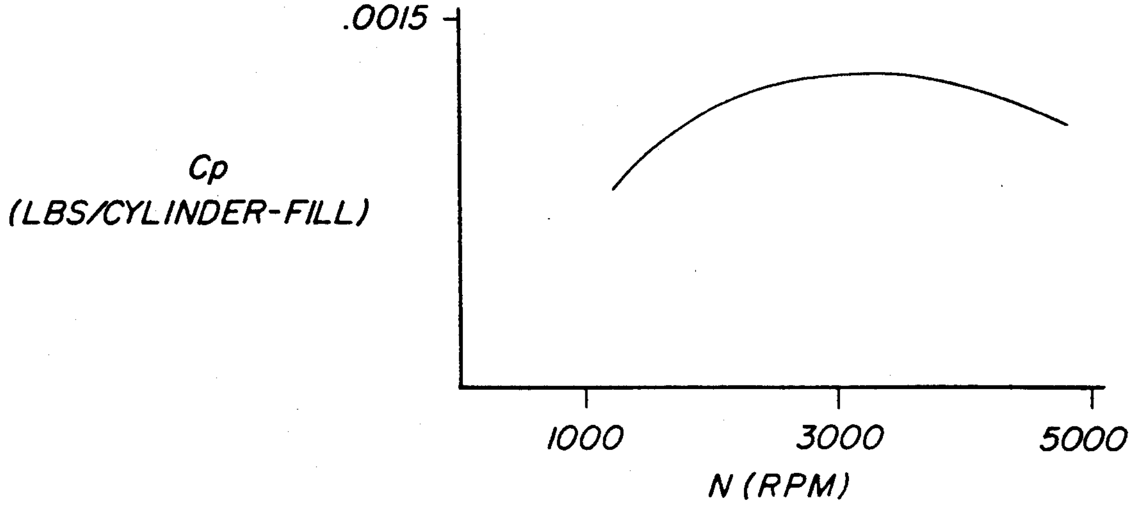
FIG. 7 is a graphical representation of a fourth look-up table which is recorded in terms of engine speed N and predicted peak air charge Cp at wide open throttle.

In step 1003, the predicted value Cp of peak air charge capable of going into the engine at wide open throttle (W.O.T.) is derived by a table look-up technique. The control unit 52 may contain a look-up table recorded in terms of engine speed N and peak air charge at wide open throttle Cp (as shown by the graphical representation in FIG. 7) for this purpose.

Alternatively, Cp may be determined by employing steps 105–119, supra. Cp substantially equals Ct when the throttle valve 24 is at its wide open position. This occurs when the throttle position S is substantially equal to 90 degrees. Thus, by determining the value Ct when S is equal to 90 degrees, Cp may be determined. It is noted that Ct determined at 90 degrees does not take into consideration air charge passing through the air bypass passageway 26 at W.O.T; however, this amount is very small at W.O.T., and is considered to be a negligible amount.

In step 1005, the ratio R and the predicted value Cb are determined by employing a look-up table (as shown by the graphical representation in FIG. 8) which is recorded in terms of the parameters of Ma, R and duty cycle D, (which will be discussed in detail below), and the following equation:

$$R = \frac{Ct + Cb}{Cp}$$

wherein:

R is the ratio of inferred current air charge going into the engine to predicted peak air charge capable of going into the engine;

Cb is the inferred air charge value equal to the predicted air charge going into the air bypass valve 28;

Ct is the inferred air charge value equal to the predicted air charge going into the throttle valve 24; and Cp is the inferred air charge value equal to the predicted peak air charge capable of going into the engine 10.

Figure 9:
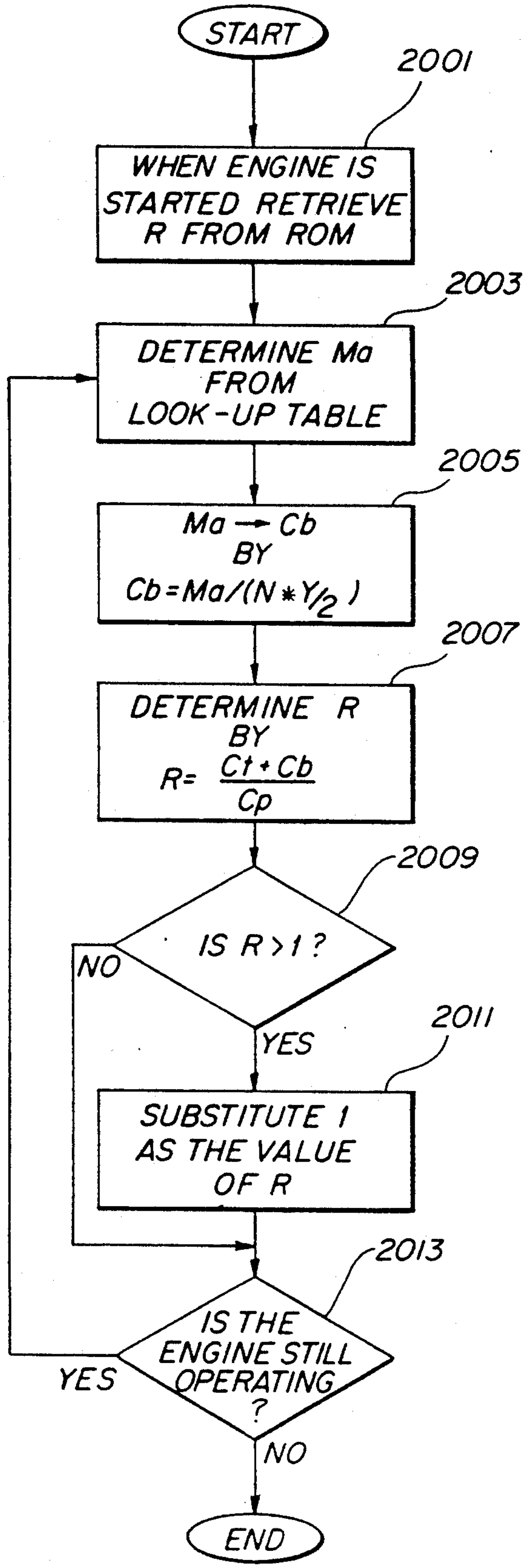
FIG. 9 is a flow chart depicting further steps which are used to determine the ratio R and the inferred air charge value Cb.

The control unit 52 employs the then current duty cycle of the air bypass valve 28, which the control unit controls and thus always has knowledge of, the values of Ct and Cp, and employs further steps, which are shown in flow chart form in FIG. 9, in order to solve for the two unknown parameters R and Cb.

Referring now to FIG. 9, the further steps which are used to determine the parameters R and Cb will now be described in detail.

In step 2001, when the engine 10 is started, the control unit 52 retrieves an initial value of R which is stored in ROM. The initial value of R is arbitrarily selected and preferably comprises a mid-range value.

In step 2003, the control unit 52 determines from the look-up table (graphically shown in FIG. 8) an air mass value Ma, which is representative of the mass of airflow passing through the air bypass valve 28 and which corresponds to the value of R selected in the preceding step and the then current duty cycle D. In step 2005, Ma is converted to an inferred air charge value Cb, which is representative of the predicted air charge passing through the air bypass valve 28 at standard pressure and temperature, by employing the following equation:

$$Cb = Ma/(N*Y/2)$$

wherein:

N is the engine speed in RPM; and

Y is the number of cylinders in the engine.

In step 2007, an updated value of R is determined by employing the equation set forth in step 1005, supra. Cb is equal to the value found in the preceding step, and Ct and Cp are determined as set forth above in steps 1001 and 1003, respectively.

In step 2009, the control unit 52 determines if R is greater than 1.0. If R is greater than 1.0, in step 2011, 1.0 is substituted for the value of R found in step 2007. If, however, R is not greater than 1.0, then the value of R found in step 2007 is employed by the control unit 52 as it proceeds to step 2013.

In step 2013, if the engine 10 is still operating, the control unit 52 employs the value of R found in step 2007, if it is less than or equal to 1.0, or if the value of R is greater than 1.0, it employs 1.0 as the value of R, and proceeds forward to step 2003. The control unit 52 continuously repeats steps 2003–2013 until the engine 10 is turned off. Since the control unit 52 repeats steps 2003–2013 at a very high speed, the control unit 52 is capable of converging upon values which are substantially equal to or equivalent to the actual values of Ma and R before the values of Ct and Cp change over time.

In a second embodiment of the present invention, barometric pressure is inferred by comparing a value Ca', which is equal to the measured mass of airflow inducted into the engine 10, inputted in step 101 supra as value F, with an inferred value Ci', which is equal to predicted mass of airflow inducted into the engine 10. The inferred value Ci' is determined essentially in the same manner that Ci is determined above in steps 105–123, except that modifications have been made to the steps to ensure that Ca' and Ci' are determined in terms of mass of airflow.

Figure 3:
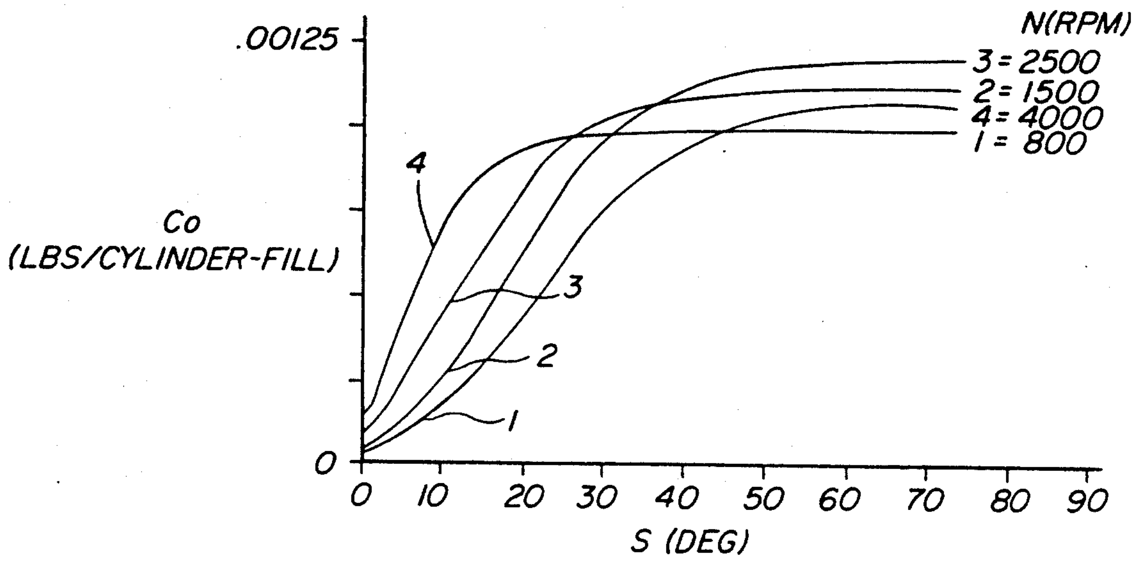
FIG. 3 is a graphical representation of a first table which is recorded in memory in terms of engine speed N, throttle valve angular position S and an inferred air charge value Co equal to the predicted air charge going into the throttle valve at 0% EGR.

In this embodiment, a look-up table is employed (not shown) which is similar to the one shown by the graphical representation in FIG. 3, and is recorded in terms of N, S, and Co', wherein Co' is equal to predicted air mass flow inducted into the intake manifold 12 via the throttle valve 24 at 0% EGR and at a standard temperature and pressure. A further look-up table (not shown) is employed which is similar to the one shown by the graphical representation in FIG. 5, and is recorded in terms of N, S, and Xc', wherein Xc' equals (air mass flow reduction/% EGR). The value of Xc' is used in step 117 to determine the value of Xo', which is equal to the amount of air mass flow which is prevented from passing into the intake manifold 12 due to exhaust gases passing through the EGR valve 44. The value Ct', which is equal to the amount of air mass flow which is inducted into the intake manifold 12 via the throttle valve 24 is then determined by adding the values of Co' and Xo' together.

In order to determine Ci', the value Ct' is added to the value of Cb'. The value Cb' is equal to the value Ma, which is determined in step 2003, supra.

Figure 8:
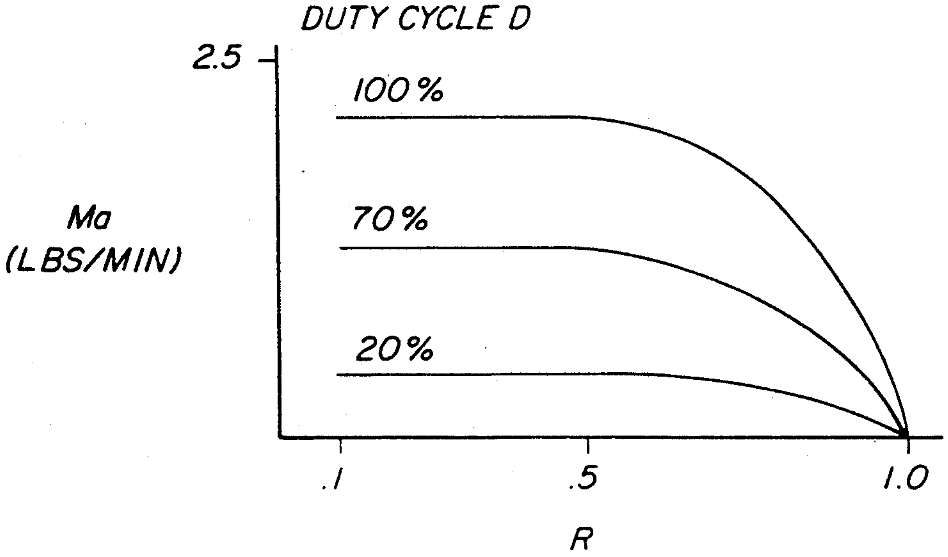
FIG. 8 is a graphical representation of a fifth look-up table which is recorded in terms of the ratio R, the duty cycle D of the air bypass valve, and the predicted value Ma of the mass of air flow passing through the air bypass valve.

The value Cb' may alternatively be determined by modifying the steps illustrated in FIGS. 6 and 9. In step 1001, Ct' is employed in place of Ct. In step 1003, Cp', which is equal to the predicted peak air mass flow inducted into the engine, is employed in place of Cp, and is determined from a look-up table similar to the one shown in FIG. 7, but is recorded in terms of peak air mass flow Cp' and engine speed N. In step 2003, a look-up table similar to the one shown in FIG. 8 is employed and is recorded in terms of Cb' and R', wherein R' is equal to the predicted current air mass flow inducted into the engine 10 to predicted peak air mass flow capable of being inducted into the engine 10. Since air charge values are not employed in the second embodiment, step 2005 is not employed. In step 2007 R is replaced with R', wherein R' is determined by employing the following equation:

$$R' = \frac{Ct' + Cb'}{Cp'}$$

wherein:

Ct' is equal to the predicted air mass flow passing through the throttle valve 24;

Cb' is equal to the predicted air mass flow passing through the air bypass valve 28; and Cp' is equal to the predicted peak air mass flow capable of passing into the engine.

After Cb' is determined, Ct' and Cb' are added together in order to determine Ci'. Barometric pressure is then inferred by employing the following equation:

$$BP = \frac{Ca' * 29.92}{Ci' * SQRT[560/(460 + T)]}$$

wherein:

Ca' is equal to the actual mass of air flow;

Ci' is equal to the inferred mass of air flow;

29.92 is standard pressure (inHg);

560 is standard temperature (deg. R); and 460 is a constant which is added to the value T to convert the same from degrees Fahrenheit to degrees Rankine.

By the present invention a method and apparatus are set forth for inferring barometric pressure surrounding an internal combustion engine having a mass air flow control system. Inferred barometric pressure is determined by comparing the actual air charge Ca going into the engine 10 to the inferred air charge Ci. Differences between the two calculations are first attributed to inlet air temperature, which is measured, and then to a change in barometric pressure, which is the inferred barometric pressure BP.

The control unit 52, after inferring barometric pressure, employs the inferred BP value to control such things as the amount of fuel needed during initial cranking of the engine, exhaust gas recirculation (EGR) and sp control in order to achieve desired emissions requirements, fuel economy and drivability.

It is contemplated by the present invention that the inferred barometric pressure BP value may be determined in an engine which does not include an air bypass passage 26 and air bypass valve 28. Inferred barometric pressure would be determined in an engine of this type in a manner essentially as described above except that an air charge value equal to air charge passing through an air bypass passage 26 would not be taken into consideration while determining the values Ca and Ci. After deriving Ca and Ci in this manner, inferred barometric pressure would be determined by employing the equation set forth in step 127, supra.

It is further contemplated that the value Ct may be determined from a single look-up table recorded in terms of the parameters N, S, % EGR, and Ct.

It is also contemplated that the sequence in which the control unit 52 performs the steps described above may be altered. For example, the inferred value Cb of air charge going into the air bypass valve may be determined before the inferred value Ct of air charge going into the throttle valve 24.

It is additionally contemplated, that the value of Ct could be determined without taking into account the amount of air charge which is prevented from passing through the throttle valve 24 due to exhaust gases flowing through the EGR valve 44 into the manifold 12. In such a system, Co would be employed for Ct.

Having described the invention in detail and by reference to preferred embodiments thereof, it will be apparent that modifications and variations are possible without departing from the scope of the invention defined in the appended claims.

What is claimed:

1. A method for controlling the operation of an internal combustion engine comprising the steps of:

measuring air mass flow entering said engine;

measuring the temperature of air entering said engine;

storing predetermined data which is representative of predicted air mass flow inducted into said engine at a standard pressure and temperature;

deriving from said predetermined data a first value which comprises predicted air mass flow inducted into said engine at the standard pressure and temperature;

determining barometric pressure surrounding said engine by inferring said barometric pressure in response to said measured air mass flow, said first value and said measured air temperature, said step of inferring said barometric pressure comprises the step of solving the following equation:

$$BP = \frac{Ca * Sp}{Ci * SQRT[St/T]}$$

wherein BP is said inferred barometric pressure; Ca comprises said measured air mass flow inducted into said engine; Ci is said first value comprising predicted air mass flow inducted into said engine; T is said measured air temperature; Sp is equal to the standard pressure; and St is equal to the standard temperature; and controlling the operation of said engine by employing said determined barometric pressure.

2. A method for controlling the operation of an internal combustion engine comprising the steps of:

measuring air mass flow entering said engine;

measuring the temperature of air entering said engine;

storing predetermined data which is representative of predicted air mass flow inducted into said engine at a standard pressure and temperature;

deriving from said predetermined data a first value which is representative of predicted air mass flow inducted into said engine at the standard pressure and temperature, said first value comprising predicted air charge inducted into said engine;

deriving a second value which comprises the actual air charge entering said engine from said measured air mass flow;

determining barometric pressure surrounding said engine by inferring said barometric pressure in response to said first value, said second value and said measured air temperature, said step of inferring said barometric pressure comprises the step of solving the following equation:

$$BP = \frac{Ca * Sp}{Ci * SQRT[St/T]}$$

wherein BP is said inferred barometric pressure; Ca comprises said second value; Ci is said first value comprising predicted air charge inducted into said engine; T is said measured air temperature; Sp is equal to the standard pressure; and St is equal to the standard temperature; and controlling the operation of said engine by employing said determined barometric pressure.

3. A method for controlling the operation of an internal combustion engine having an intake manifold, a throttle valve positionable over a given angular range, an EGR valve capable of allowing a variable amount of exhaust gases to recirculate into said intake manifold, and an air bypass valve operable over a given air bypass valve duty cycle range, said method comprising the steps of:

measuring air mass flow entering said intake manifold;

measuring the temperature of air entering said intake manifold;

storing first predetermined data which comprises predicted air mass flow inducted into said intake manifold via said throttle valve with 0 exhaust gases flowing into said intake manifold through said EGR valve;

storing second predetermined data which is indicative as predicted air mass flow which is prevented from passing into said intake manifold due to exhaust gases flowing into said intake manifold through said EGR valve;

storing third predetermined data which is representative of predicted air mass flow inducted into said intake manifold via said air bypass valve;

deriving from said first predetermined data a first values which comprises predicted air mass flow inducted into said intake manifold via said throttle valve with 0 exhaust gases flowing into said intake manifold;

deriving from said second predetermined data a second value indicative of predicted air mass flow which is prevented from passing into said intake manifold due to exhaust gases flowing into said manifold via said EGR valve;

deriving from said third predetermined data a third value which comprises predicted air mass flow inducted into said intake manifold via said air bypass valve;

deriving a fourth value from said first, second and third values which comprises predicted air mass flow inducted into said intake manifold via said throttle valve and said air bypass valve;

determining barometric pressure surrounding said engine by inferring said barometric pressure in response to said measured air mass flow, said fourth value and said measured air temperature, said step of inferring said barometric pressure comprises the step of solving the following equation:

$$BP = \frac{Ca * Sp}{Ci * SQRT[St/T]}$$

wherein BP is said inferred barometric pressure; Ca comprises said measured air mass flow inducted into said intake manifold; Ci is said fourth value comprising predicted air mass flow inducted into said intake manifold; T is said measured air temperature; Sp is equal to a standard pressure; and St is equal to a standard temperature; and controlling the operation of said engine by employing said determined barometric pressure.

4. A method for controlling the operation of an internal combustion engine having an intake manifold, a throttle valve positionable over a given angular range, an EGR valve capable of allowing a variable amount of exhaust gases to recirculate into said intake manifold, and an air bypass valve operable over a given air bypass valve duty cycle range, said method comprising the steps of:

measuring air mass flow entering said intake manifold;

measuring the temperature of air entering said intake manifold;

storing first predetermined data which comprises predicted air charge inducted into said intake manifold via said throttle valve with 0 exhaust gases flowing into said intake manifold through said EGR valve;

storing second predetermined data which is indicative of predicted air charge which is prevented from passing into said intake manifold due to exhaust gases flowing into said intake manifold through said EGR valve;

storing third predetermined data which is representative of predicted air mass flow inducted into said intake manifold via said air bypass valve;

deriving from said first predetermined data a first value which comprises predicted air charge inducted into said intake manifold via said throttle valve with 0 exhaust gases flowing into said intake manifold;

deriving from said second predetermined data a second value indicative of predicted air charge which is prevented from passing into said intake manifold due to exhaust gases flowing into said manifold via said EGR valve;

deriving from said third predetermined data a third value which comprises predicted air mass flow inducted into said intake manifold via said air bypass valve;

deriving a fourth value from said first, second and third values which comprises predicted air charge inducted into said intake manifold via said throttle valve and said air bypass valve;

deriving a fifth value which comprises the actual air charge entering said intake manifold from said measured air mass flow;

determining barometric pressure surrounding said engine by inferring said barometric pressure surrounding said engine in response to said fourth value, said fifth value and said measured air temperature, said step of inferring said barometric pressure comprises the step of solving the following equation:

$$BP = \frac{Ca * Sp}{Ci * SQRT[St/T]}$$

wherein BP is said inferred barometric pressure; Ca comprises said fifth value; Ci is said fourth value comprising predicted air charge inducted into said intake manifold; T is said measured air temperature; Sp is equal to a standard pressure; and St is equal to a standard temperature; and controlling the operation of said engine by employing said determined barometric pressure.

5. A system for controlling the operation of an internal combustion engine comprising:

means for measuring air mass flow entering said engine;

means for measuring the temperature of air entering said engine;

processor means connected to said air mass flow measuring means and said air temperature measuring means for receiving inputs of said air mass flow and said air temperature, for storing predetermined data which is representative of predicted air mass flow inducted into said engine at a standard pressure and temperature, for deriving from said predetermined data a first value which comprises predicted air mass flow inducted into said engine at the standard temperature and pressure, for inferring barometric pressure surrounding said engine in response to said measured air mass flow input, said first value and said measured temperature input, and for controlling the operation of said internal combustion engine by employing said inferred barometric pressure; and, wherein said processor means infers said barometric pressure by solving the following equation:

$$BP = \frac{Ca * Sp}{Ci * SQRT[St/T]}$$

wherein BP is said inferred barometric pressure; Ca comprises said measured air mass flow inducted into said engine; Ci is said first value comprising predicted air mass flow inducted into said engine; T is measured air temperature; Sp is equal to the standard pressure; and St is equal to the standard temperature.

6. A system for controlling the operation of an internal combustion engine comprising:

means for measuring air mass flow entering said engine;

means for measuring the temperature of air entering said engine;

processor means connected to said air mass flow measuring means and said air temperature measuring means for receiving inputs of said air mass flow and said air temperature, for storing predetermined data which is representative of predicted air mass flow inducted into said engine at a standard pressure and temperature, for deriving from said predetermined data a first value which comprises predicted air charge inducted into said engine at the standard pressure and temperature, for deriving a second value which comprises the actual air charge entering said engine from said measured air mass flow, for inferring barometric pressure surrounding said engine in response to said firs value, said second value and said measured temperature input, and for controlling the operation of said internal combustion engine by employing said inferred barometric pressure; and, wherein 'said processor means infers said barometric pressure by solving the following equation:

$$BP = \frac{Ca * Sp}{Ci * SQRT[St/T]}$$

wherein BP is said inferred barometric pressure; Ca comprises said second value; Ci is said first value comprising predicted air charge inducted into said engine; T is said measured air temperature; Sp is equal to the standard pressure; and St is equal to the standard temperature.

7. A control system for controlling the operation of a motor vehicle internal combustion engine including an intake manifold, a throttle valve positionable over a given angular range, an EGR valve capable of allowing a variable amount of exhaust gases to recirculate into said intake manifold, and an air bypass valve operable over a given air bypass valve duty cycle range said system being capable of inferring barometric pressure surrounding said engine and comprising:

means for measuring the rotational speed of said internal combustion engine;

means for measuring the angular position of said throttle valve;

means for measuring air mass flow entering said intake manifold;

means for measuring the temperature of air entering said intake manifold;

derivation means being connected to said engine speed measuring means, said throttle valve position measuring means, said air mass flow measuring means and said air temperature measuring means for receiving inputs of said engine speed, said throttle valve angular position, said air mass flow and said air temperature;

said derivation means including memory means for storing predetermined data in a first look-up table which is representative of predicted air mass flow inducted into said intake manifold via said throttle valve with 0 exhaust gases flowing into said intake manifold through said EGR valve as a function of a first portion of said inputs, storing predetermined data in a second look-up table which is indicative of predicted air mass flow which is prevented from passing into said intake manifold due to exhaust gases flowing into said manifold through said EGR valve as a function of a first portion of said inputs, and storing predetermined data in a third look-up table which is representative of predicted air mass flow inducted into said intake manifold via said air bypass valve as a function of the air bypass valve duty cycle and a ratio of predicted current air charge going into said engine to predicted peak air charge capable of going into said engine; and said derivation means deriving a first value representative of predicted air mass flow inducted into said intake manifold via said throttle valve with 0 exhaust gases flowing into said intake manifold by comparing said first portion of said inputs with said predetermined data stored in said first look-up table, deriving a second value indicative of predicted air mass flow which is prevented from passing into said intake manifold due to exhaust gases flowing into said manifold through said EGR valve by comparing said first portion of said inputs with said predetermined data stored in said second look-up table, deriving a third value representative of predicted air mass flow inducted into said intake manifold via said air bypass valve in response to said air bypass valve duty cycle, said ratio of predicted current air charge going into said engine to predicted peak air charge and said third look-up table, and deriving a fourth value from said first, second and third values which is representative of predicted air mass flow inducted into said intake manifold via said throttle valve and said air bypass valve;

said derivation means inferring said barometric pressure surrounding said engine in response to said fourth value and a second portion of said inputs; and said derivation means controlling the operation of the internal combustion engine by employing said inferred barometric pressure.

8. A control system as set forth in claim 7, wherein said first portion of said inputs comprises said engine speed input and said throttle valve angular position input, and said second portion of said inputs comprises said air mass flow input and said air temperature input.

* * * * *

UNITED STATES PATENT AND TRADEMARK OFFICE

CERTIFICATE OF CORRECTION

PATENT NO. : 5,136,517

DATED : August 4, 1992

INVENTOR(S) : Cullen et al.

It is certified that error appears in the above-identified patent and that said Letters Patent is hereby corrected as shown below:

Col. 20, Line 5, "values which" should be --value which--.
Col. 22, Line 22, "to said firs" should be --to said first--.
Col. 22, Line 26, "wherein 'said" should be --wherein said--.
Col. 22, Line 46, "cycle range said" should be --cycle range, said--.

Signed and Sealed this

Twenty-first Day of September, 1993

Attest:

Bruce Lehman

BRUCE LEHMAN

*Attesting Officer*

*Commissioner of Patents and Trademarks*